April 16, 1940.  D. C. BAILEY  2,197,332
WEATHER STRIP
Filed Jan. 18, 1939
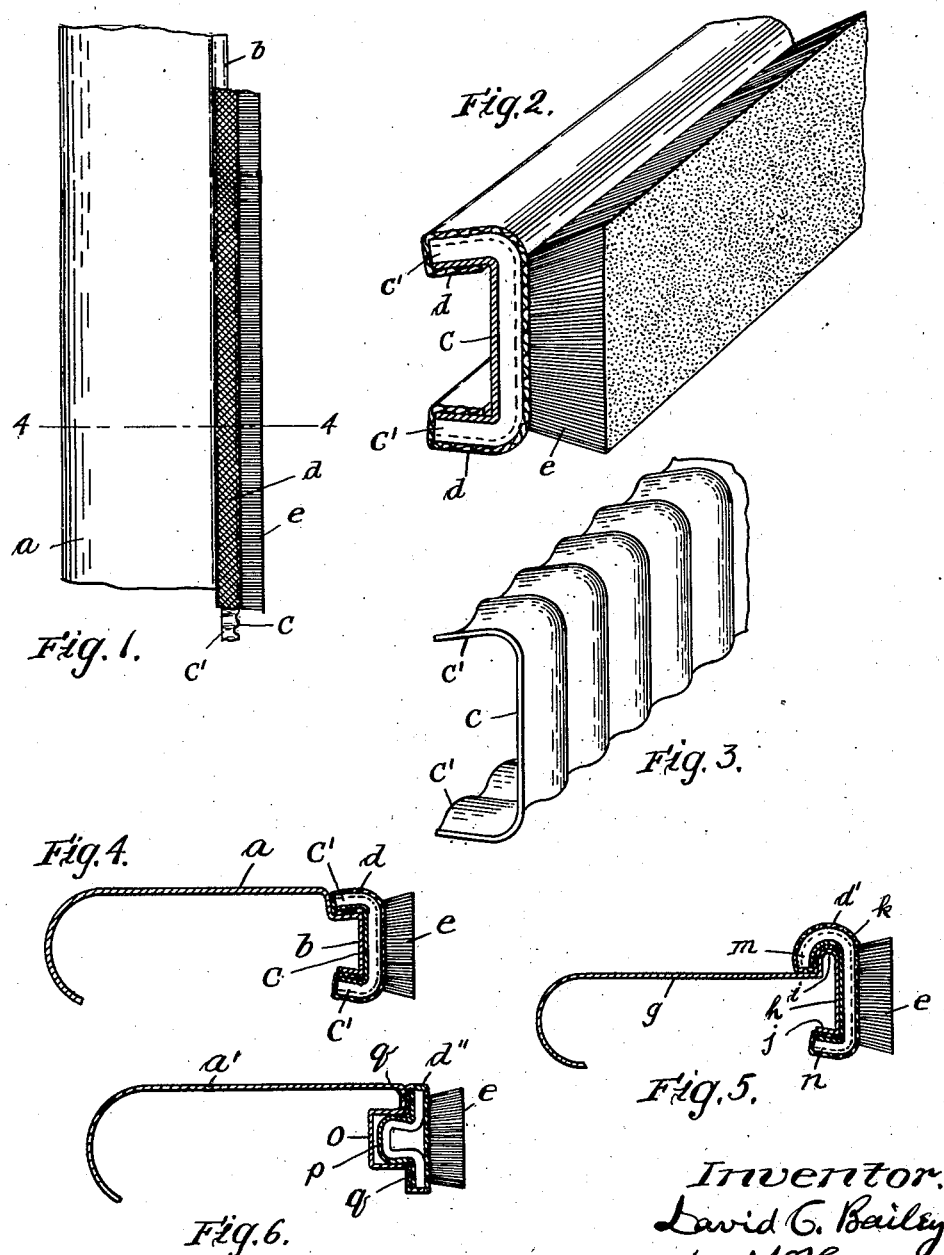
Inventor.
David C. Bailey
by L. H. Herriman
atty.

Patented Apr. 16, 1940

2,197,332

UNITED STATES PATENT OFFICE 2,197,332

WEATHER STRIP

David C. Bailey, Amesbury, Mass.

Application January 18, 1939, Serial No. 251,544

7 Claims. (Cl. 20—69)

This invention relates to certain improvements in weather strips, or window glass cushioning means, which are primarily intended for use in automobile bodies, and more particularly to an improved construction for attaching such means to the body.

Prior to my invention weather or draft strips have usually been attached to the body by means of staples, or small fasteners, and such fastening means have been found to be objectionable, as they frequently permitted water to enter the interior of the body, thereby causing damage to the upholstery and trim.

The primary object of my invention is to provide a construction of garnish molding, or other body part, and a weather strip, which will not require the use of staples, or other supplemental fastening means to secure the strip in position, and which will provide a water or weather tight connection between the strip and body part. Also to provide a construction which will permit the strip to be quickly attached, and, when attached, will securely hold the strip in position, so that all possibility that the strip will become displaced in use will be avoided.

A further object is to provide a form of cushion carrying strip which may be produced at low manufacturing cost.

I accomplish these objects by providing the molding, or other part to which the strip is to be attached, with a projecting rib, or groove, which is designed to receive a cushion holding weather strip which is correspondingly constructed, so that they may be interengaged by pressing the strip onto, or into the body part, and will thereby provide a water tight joint, as well as a secure connection.

For a disclosure of the specific means which I employ, reference is now made to the following specification, in connection with the accompanying drawing in which:

Fig. 1 is a side elevation of a section of a garnish molding containing an embodiment of my invention.

Fig. 2 is a combined sectional and perspective view of one form of weather strip which I may employ.

Fig. 3 is a detail perspective view of the weather strip core employed in the strip disclosed in Fig. 2.

Fig. 4 is a sectional view at line 4—4 of Fig. 1.

Figs. 5 and 6 are similar views illustrating modifications.

In the drawing a section of a garnish molding $a$ is indicated which is formed of sheet metal by means of dies and according to one form of my invention, when the molding, or other part is formed, a rib $b$ is formed thereon, which is located in the surface portion which is to be engaged by the window glass, or to which the weather strip is to be applied. Said rib is of dove-tail formation, as its sides are slightly inclined inward from the top of the rib, as shown in Fig. 4.

I further provide a weather strip which comprises a core consisting of a strip of thin corrugated sheet metal, the corrugations in which extend transversely from edge to edge of the strip, as shown in Fig. 3, and are arranged closely together as shown, said strip being bent transversely in channel form, providing a longitudinal middle portion $c$ and two side portions $c'$ of equal width, the width of said middle portion and said side portions internally corresponding to the width of the top portion of the rib $b$ and to the height of its sides respectively. The sides of the core extend at a slight convergence from the middle portion, as shown in Figs. 2 and 3.

Said core is covered with a textile fabric $d$ which is adhesively connected thereto and extends transversely from within the sides of the core about the outer sides and middle thereof. The middle portion of the fabric is provided with a cushioning pile $e$ which is interwoven therein, or is otherwise secured thereto, and which extends for the length of the core and the width of its top portion, as shown in Fig. 2.

The weather strip, as thus constructed, is forced onto the rib $b$, as shown in Figs. 1 and 4, the sides of the core $c$ being sprung apart slightly by this operation, so that when the middle portion of the core is pressed against the top of the rib, the sides of the core will spring towards each other and firmly engage the sides of the rib, and, as the sides of the latter are slightly inclined inward, the weather strip will become securely connected to the body part, as shown in Fig. 4, and a water tight joint will be provided. It will be understood that if a window glass is to be cushioned, the glass will be located between the cushioning pile on two adjacently disposed moldings. Also that if the molding and the rib which is formed thereon, is of curved formation, the strip may be readily bent correspondingly.

In Fig. 5 a slightly modified form of attaching rib for the body member is illustrated together with a correspondingly modified form of core for the weather strip.

In this form the body $g$ is formed to provide a rib $h$ having a transversely projecting portion $i$ at one side and an inwardly inclined side portion $j$ at the opposite side. In this instance the core $k$ is correspondingly shaped, having one side $m$ of hook formation and the other side $n$ formed to provide an inwardly inclined edge portion, otherwise the construction is similar to that already described, the covering $d'$ which carries the cushioning strip $e$ extending over the outer side of the core onto the inner sides of its portions $m$ and $n$.

In applying the weather strip, the side $m$ is hooked onto projection $i$ and then the strip is pressed inward, so that the side $n$ engages the side $j$ of the rib.

Consequently, when the middle portion of the core is pressed against the top of the rib, the core and rib will be interlocked, so that the weather strip will be securely attached to the molding, and a water tight joint will be provided.

In Fig. 6 another construction is illustrated which, for several reasons, is considered preferable to those already described.

In this construction the molding $a'$ is provided with a parallel sided groove $o$, in lieu of the ribs previously described. The weather strip, which is employed in connection therewith, comprises a core which is formed of transversely corrugated sheet metal, as previously described. The core is bent to provide a U-form middle portion $p$ and two edge portions $q$, which extend oppositely from the sides of the middle portion in the same plane and at approximately right angles to the sides of the middle portion. The sides of the middle portion extend from the bottom portion thereof to the edge portions $q$ at a slight convergence, the widest portion thereof at its bottom end corresponding in width to the width of the groove $o$.

In this instance the fabric $d''$ extends over the outer sides of the edge portions $q$ and about the edges thereof and onto the inner sides of said edge portions and the cushioning pile $e$ is located on the outer sides of said edge portions $q$, as shown.

In attaching the weather strip to the molding, the U-shaped portion $p$ of the core is pushed into the groove $o$ and the widest portion thereof at its base end is such that there will be a strong frictional engagement thereof with the sides of the groove, but this frictional engagement is not sufficiently strong to cause any difficulty in forcing it into the position shown in Fig. 6, in which position the end portions of the fabric will be pressed against the surface of the molding. The metal of which the core is formed is slightly resilient and when it is pushed into the groove its converging sides may be pressed together slightly, so that, when it has been pushed in to the fullest extent, the sides will firmly grip the sides of the groove and thus hold the strip securely in this position. As a result the weather strip will be at least as securely attached as it is with the forms previously described, and the connection formed will be at least as water tight as in the other forms.

The form last described is preferable over those previously described for several reasons, one of the more important of which is that the width of the surface which is exposed between the molding and the cushioning strip, and which is covered by the textile fabric, is substantially narrower in the form shown in Fig. 6 than in the other two forms. Also the parallel sided groove in the molding may be more easily formed by a dieing operation than the ribs in the other forms. So far as the cost of the weather strip is concerned the cost of manufacture is substantially the same in all the forms.

I claim:

1. In combination with a body member having an elongated groove in the face side thereof, a weather strip having a sheet metal core, said core having a transversely corrugated U-form middle portion the sides thereof being tightly fitted to said groove and interlocked therein, and having oppositely and outwardly extending end portions, and cushioning means on said end portions.

2. In combination with a body member having an elongated groove in the face side thereof, the sides of said groove from the bottom thereof outward being approximately parallel, a weather strip having a sheet metal core, said core having a transversely corrugated U-form middle portion the sides thereof being tightly fitted into said groove and having oppositely and outwardly extending end portions, and cushioning means on said end portions.

3. In combination with a body member having an elongated groove in the face side thereof, the sides of said groove from the bottom thereof outward being approximately parallel, a weather strip having a sheet metal core, said core having a transversely corrugated U-form middle portion the sides of which extend at a slight convergence from the bottom thereof outward and said sides being tightly fitted to the sides of said groove, and the end portions of said core being extended transversely to the sides of said U-shaped portion and having cushioning means thereon.

4. In combination with a body member having an elongated groove in the face side thereof, the sides of said groove from the bottom thereof outward being approximately parallel, a weather strip having a sheet metal core, said core having a transversely corrugated U-form middle portion the sides of which extend at a slight convergence from the bottom thereof outward and said sides being tightly fitted to the sides of said groove, the end portions of said core being extended oppositely at approximately right angles to the sides of the U-shaped portion and a fabric covering extending over the outer sides of said end portions and about the edges and onto the inner sides thereof in position to be clamped between said end portions and the body member at the sides of said groove and cushioning material on the fabric at the outer sides of said end portions of the core.

5. A weather strip for a body member having an elongated groove comprising a sheet metal core having a transversely corrugated U-form middle portion, the sides of which are adapted to be tightly fitted to the sides of the groove and the end portions of said core being extended oppositely at approximately right angles to the sides of said middle portion, and cushioning means on the opposite sides of said end portions from said middle portion.

6. A weather strip for a body member having an elongated groove comprising a sheet metal core having a transversely corrugated U-form middle portion, the sides of said portion being extended from the bottom thereof at a slight convergence and being adapted to be tightly fitted to the sides of the groove, and the end portions of said core being extended oppositely at approximately right angles to said sides and having cushioning means thereon.

7. A weather strip for a body member having an elongated groove comprising a sheet metal core having a transversely corrugated U-form middle portion, the sides of which are adapted to be tightly fitted to the sides of the groove and the end portions of said core being extended oppositely at approximately right angles to the sides of said middle portion, a fabric covering extending over the outer sides of said end portions and onto the inner sides thereof and cushioning means on the outer portion of the fabric.

DAVID C. BAILEY.